United States Patent
Stratton

(10) Patent No.: US 6,363,622 B1
(45) Date of Patent: Apr. 2, 2002

(54) MULTIPURPOSE RETRACTABLE TAPE MEASURE

(76) Inventor: Gary S. Stratton, 318 S. Yale Ave., Villa Park, IL (US) 60181-2560

( * ) Notice: Subject to any disclaimer, the term of this patent is extended or adjusted under 35 U.S.C. 154(b) by 0 days.

(21) Appl. No.: 09/336,881

(22) Filed: Jun. 18, 1999

(51) Int. Cl.$^7$ .................................................. G01B 3/10
(52) U.S. Cl. .......................... 33/761; 33/27.02; 33/759; 33/668
(58) Field of Search .......................... 33/27.02, 27.031, 33/27.032, 333, 334, 342, 354, 391, 528, 613, 645, 668, 755, 758, 759, 760, 761, 768, 770, 767

(56) References Cited

U.S. PATENT DOCUMENTS

| | | | |
|---|---|---|---|
| 1,438,903 A | 12/1922 | Crogan | |
| 1,855,651 A | 4/1932 | Roberson | |
| 2,624,120 A | * 1/1953 | Mills | 33/668 |
| 2,835,038 A | 5/1958 | Perrin | |
| 3,021,599 A | * 2/1962 | Odom | 33/275 R |
| 3,148,455 A | 9/1964 | Aciego | |
| 3,568,322 A | 3/1971 | Showers | |
| 3,577,641 A | * 5/1971 | Smith | 33/27.02 |
| 3,731,389 A | * 5/1973 | King | 33/668 |
| 3,869,805 A | 3/1975 | Dieringer | |
| 4,182,046 A | 1/1980 | Ludlow et al. | |
| 4,188,729 A | 2/1980 | Peterson | |
| 4,439,927 A | * 4/1984 | Elliot | 33/668 |
| 4,476,635 A | * 10/1984 | Hart | 33/228 |
| 4,590,680 A | 5/1986 | Hanchett et al. | |
| 4,697,349 A | 10/1987 | Lee | |
| 4,700,489 A | 10/1987 | Vasile | |
| 4,716,354 A | 12/1987 | Baucom et al. | |
| 4,922,620 A | 5/1990 | Terragni | |
| 4,965,941 A | * 10/1990 | Agostinacci | 33/668 |
| 5,092,057 A | 3/1992 | Hoenig, Sr. | |
| 5,103,574 A | * 4/1992 | Levy | 33/760 |
| 5,133,135 A | 7/1992 | Durfee, Jr. | |
| 5,239,761 A | 8/1993 | Wu et al. | |
| 5,416,987 A | 5/1995 | Kaufman | 33/770 |
| 5,430,952 A | 7/1995 | Betts | |
| 5,435,074 A | * 7/1995 | Holevas et al. | 33/668 |
| 5,720,106 A | 2/1998 | Serksnis | |
| 5,735,052 A | 4/1998 | Lin | |
| 5,809,662 A | 9/1998 | Skinner | |
| 5,829,152 A | 11/1998 | Potter et al. | 33/668 |
| 5,933,973 A | * 8/1999 | Fenley, Jr. | 33/451 |

FOREIGN PATENT DOCUMENTS

| | | |
|---|---|---|
| DE | 13808 | 6/1897 |
| GB | 2273985 A | 7/1994 |
| JP | 61133801 A | 6/1986 |
| JP | 282101 A | 3/1990 |

OTHER PUBLICATIONS

Sonic Calcu–Tape Advertisement, May 1989.

* cited by examiner

*Primary Examiner*—Diego Gutierrez
*Assistant Examiner*—R. Alexander Smith
(74) *Attorney, Agent, or Firm*—Robert L. Marsh

(57) ABSTRACT

A tape measure usable for positioning and repositioning an object on a vertical surface comprises a housing having a planar forward surface, a rearward surface spaced from the forward surface, and a cavity having an aperture therein. A flexible, retractable, coiled tape measure is mounted in the housing the working end of which extends through the aperture in the housing. A pin is provided at the distal end of the tape for marking a point on a surface. The housing has a second pin thereon which is axially moveable from an extended position to a retracted position such that it is useable as a marker when the pin is in the extended position. The rearward surface of the housing has a 360° angle measuring device for measuring the angle at which the housing is oriented with respect to an edge defined by the intersection of a side panel and the forward surface of the housing.

6 Claims, 4 Drawing Sheets

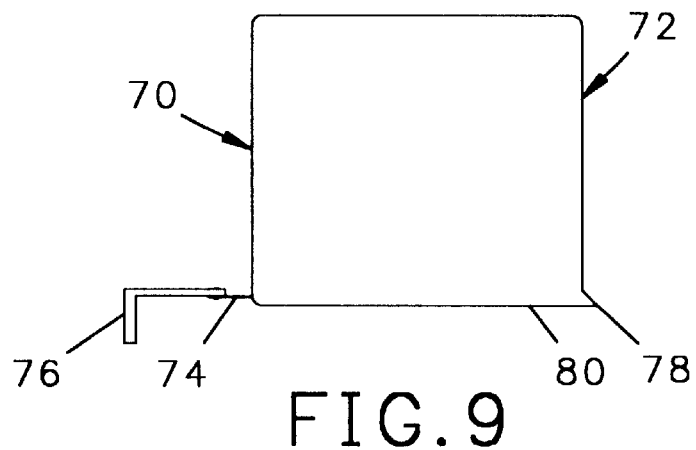
FIG. 9
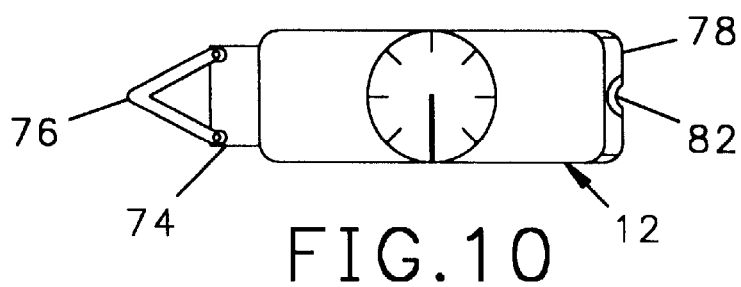
FIG. 10
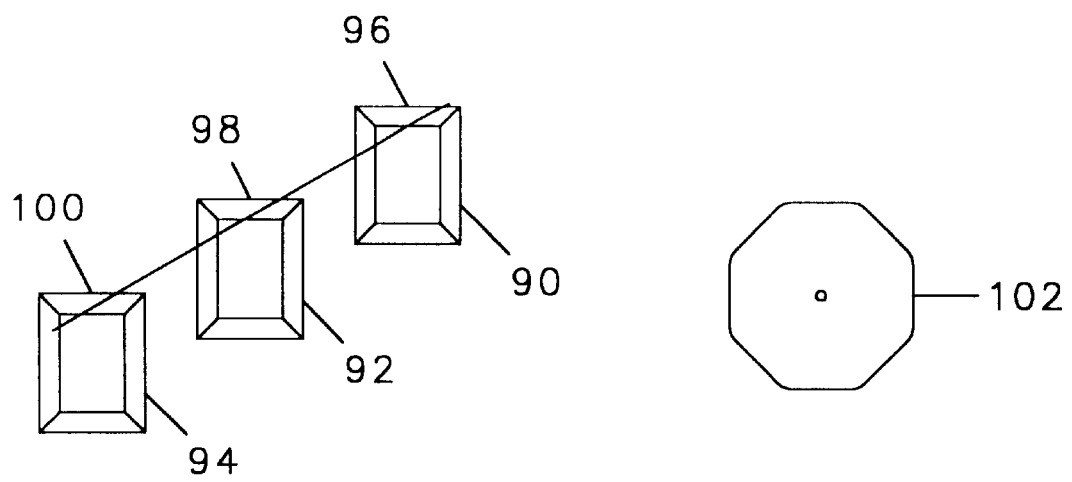
FIG. 11
FIG. 12

MULTIPURPOSE RETRACTABLE TAPE MEASURE

The present invention relates to retractable tape measures, and in particular to a tape measure which can be used to measure and reproduce the angles and distance between two points on a vertical surface.

BACKGROUND OF THE INVENTION

A retractable tape measure has an enclosure with a long, flexible tape coiled within the enclosure, thereby providing a very small package for retaining a very long measuring device. Numerous improvements to the tape measure are well known. A spring loading of the spool facilitates rewinding of a tape after its services are no longer needed. A spring steel tape having an arcuate cross section provides a degree of rigidity to the extended tape.

Existing tape measures, however, can do little to plot the relationship of two points on a vertical surface except to determine the distance between them. If both points are spaced from the ceiling or floor, the orientation of the two points may be reconstructed on another wall by measuring the elevation of the points from a floor or ceiling, but the undertaking of such measurements is tedious and the measurements are subject to error caused by uneven floors or ceilings. It would therefore be desirable to provide a tape measure device which can be used to measure the distance and angular orientation of two points on a vertical surface such that the measurement can be reconstructed on another vertical surface without requiring the taking of measurements from a floor or ceiling.

SUMMARY OF THE INVENTION

Briefly, the present invention is embodied in tape measure usable for positioning and repositioning an object on a vertical surface comprising a housing having a planar forward surface, a rearward surface spaced from the forward surface, and a cavity having an aperture therein. Side panels connect the forward and rearward surfaces to form the housing and the corners between the side panels and the rear surface define straight lines. A flexible, retractable, coiled tape measure is mounted in the housing for movement about an axis of rotation oriented parallel to the forward surface and the working end of the tape extends through an aperture in the housing. A pin is provided at the distal end of the tape for marking a point on a surface.

The housing has a second pin thereon which is axially moveable from an extended position to a retracted position such that it is useable as a marker when the pin is in the extended position. The device may further include a locking means whereby the coil of tape is locked against rotation when the pin is retracted, thereby locking the linear distance between the two pins.

In accordance with the present invention, the rearward surface of the housing has a 360° angle measuring means for measuring an angle at which the housing is oriented with respect to an edge defined by the intersection of a side panel and the forward surface.

The device can be used whenever the distance or the vertical relationship between the two points must be duplicated or recorded. It can be used to set the angle and the distances for mounting an object on a wall, or it can be used to find or set the angle of the surface of a table such as a pool table. It can be used to find an angle under circumstances when existing angle finders are unusable.

By way of example, the device can be used to locate mounting holes for mounting an object having mountings at different vertical levels by positioning the mounting surface vertically in the orientation it is to have when it is mounted to a wall. The pin on the housing is positioned in one mounting and the pin on the distal end of the tape is positioned in the other mounting and the tape is locked against rotation with the pin retracted in the housing. The angular orientation of the two mountings is recorded by the angle measuring device and the distance between the pins is fixed by the length of tape extending from the housing. The angular orientation between the mountings of the object is reversed to locate the angle and distance between mounting holes on a wall for retaining the object.

BRIEF DESCRIPTION OF THE DRAWINGS

A better and more complete understanding of the present invention will be had after a reading of the following detailed description taken in conjunction with the following drawings wherein:

FIG. 9 is a side elevational view of a second embodiment of a tape measure in accordance with the present invention;

FIG. 10 is a rear view of the tape measure shown in FIG. 9;

FIG. 11 depicts the relationship of three pictures on a wall; and

FIG. 12 depicts a geometric shape drawn on a surface.

DETAILED DESCRIPTION OF THE PREFERRED EMBODIMENT

Figure 1:
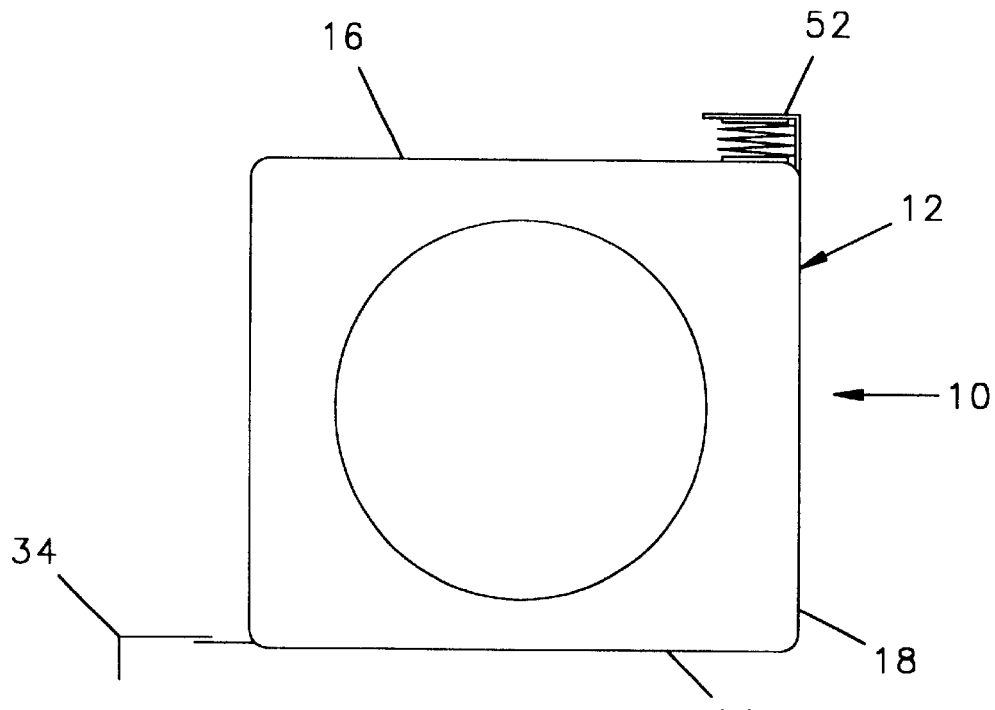
FIG. 1 is a side view of a tape measure in accordance with the present invention.
Figures 4, 5:
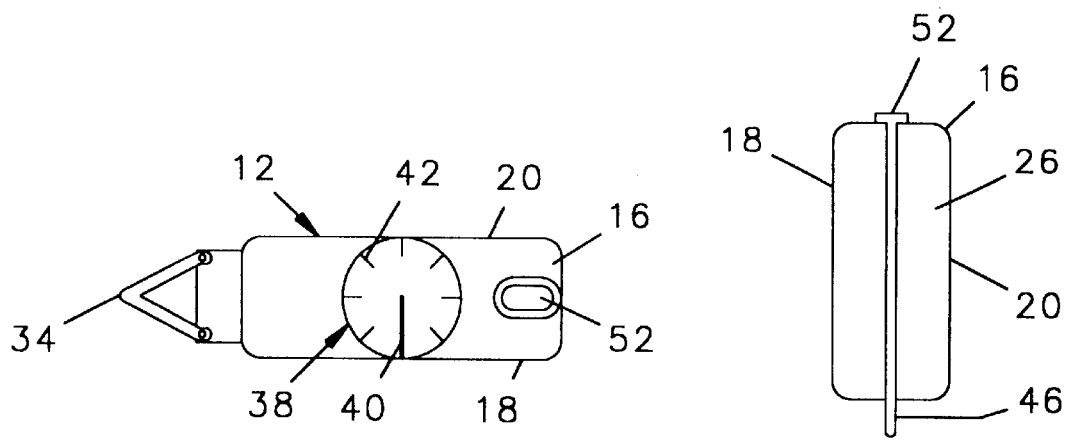
FIG. 4 is a rear elevational view of the tape measure shown in FIG. 1.
FIG. 5 is an end elevational view of the tape measure in FIG. 1 showing the extendable pin.

Referring to FIGS. 1–6, a tape measure 10 in accordance with the present invention has a housing 12. For the purposes of this discussion, the tape measure 10 will be described as though it were applied against a vertical surface with the flat of the tape abutting the surface. Accordingly, the surface 14 of the housing 12 which is adapted to be applied against such a vertical surface is described herein as being the forward surface, and all similarly oriented portions will be described as being forwardly and oppositely directed positions will be described as being rearwardly. The housing 12 therefore also has a rearward surface 16 which is preferably also planar and spaced from the forward surface 14 and extending between the forward surface 14 and the rearward surface 16 are opposing side panels 18, 20. The enclosure further includes a first end panel 22 having an aperture 24 therein and an opposing second end panel 26.

Figure 6:
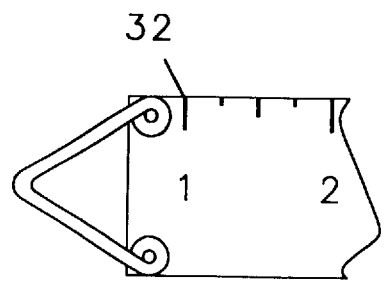
FIG. 6 is an enlarged view of the markings on the distal end of the end of the tape shown in FIG. 1.

Within the cavity of the housing 12 is a spool mounted flexible tape 28 having an axis 30 of rotation that is parallel to the forward surface 14 and having markings 32 along the length thereof for measuring linear distance in any suitable scale such as the metric or English systems. The tape 28 is adapted to unwind through the aperture 24 and the distal end 34 of the tape has a suitable marking means 36 for marking a point. In one embodiment, the marking means 36 is a transverse pin as shown. As shown in FIG. 6, the measurement markings 32 on the tape 28 begin at the pin 36.

Mounted in the rearward surface 16 of the housing 12 is an angle indicating device 38, which may include a pendulum with a weight 40 as shown and a plurality of angle indicator markings 42 on the housing. The pendulum weight 40 is mounted for rotation on an axis 44 that is perpendicular to the forward surface 14. Accordingly, when the tape measure 10 is positioned with the forward surface 14 against a vertical wall, the pendulum 40 will extend downwardly. The housing 12 can be rotated about the axis 44 and the angle of the housing 10 as defined by the orientation of the planes of the first and second sides 18, 20 and of the extended end 34 of the tape is determined by the position of the weight 40 against the indicator markings 42 of the angle indicator device 38.

Figure 2:
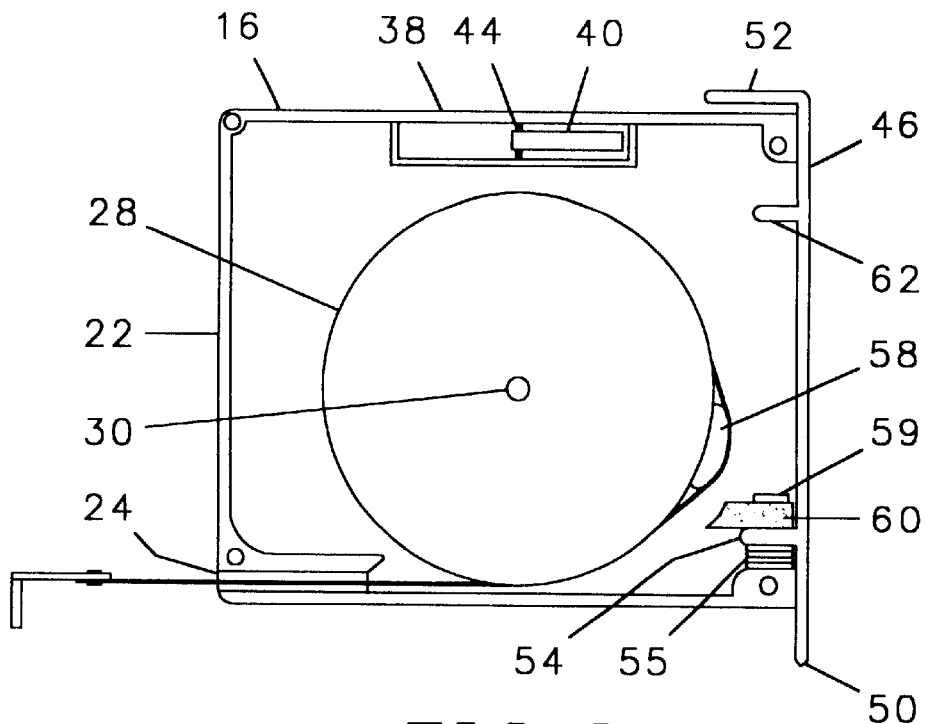
FIG. 2 is a cross sectional side view of the tape measure shown in FIG. 1 with an extendable pin in the extended position.
Figure 3:
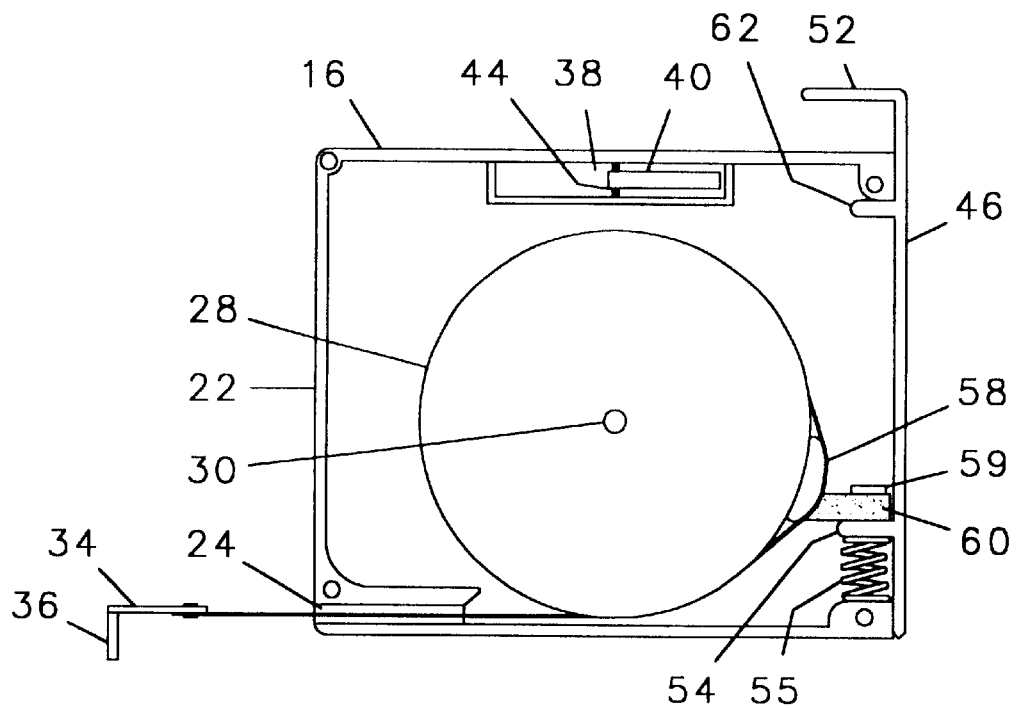
FIG. 3 is a second cross sectional view of the tape measure shown in FIG. 1 with the extendable pin in the retracted position.

The housing 12 further includes a retractable pin 46 mounted for axial movement along a track in the housing 12 formed by an elongate slot, not shown, extending from the forward surface 14 to the rearward surface 16. The pin 46 has a tapered end 50 that is extendable beyond the forward surface 14 and has a second end with a transverse thumb plate 52 thereon. The pin 46 is sufficiently long to permit the tapered end 50 to extend beyond the forward surface 14 when the thumb plate 52 is positioned against the rearward surface 16 as shown in FIG. 2. The pin 46 has a projection 54 which extends into the housing 12 and a coil spring 55 extending between a forward portion of the housing 12 and the projection 54 and the spring is biased to move the thumb plate 52 rearward to the retracted position as shown in FIG. 3. Adjacent to the outer circumference of the coiled tape 28 and joined to the inner surface of the two side panels 18, 20 is an arcuate metal brake pad 58 around which the end of the tape 28 is wrapped before it extends through the aperture 24 in the housing 12. Secured to the rearward surface of the projection 54, by a locking pin 59 is a foam rubber brake pad 60 having an arcuate surface which is urged by the spring 55 against the tape 28, to thereby lock the tape 28 against movement when the pin 46 is in the retracted position. A second projection 62 on the pin 46 also extends through the slot in the housing and engages the housing 12 when the pin 46 is in the retracted position.

Figure 7:
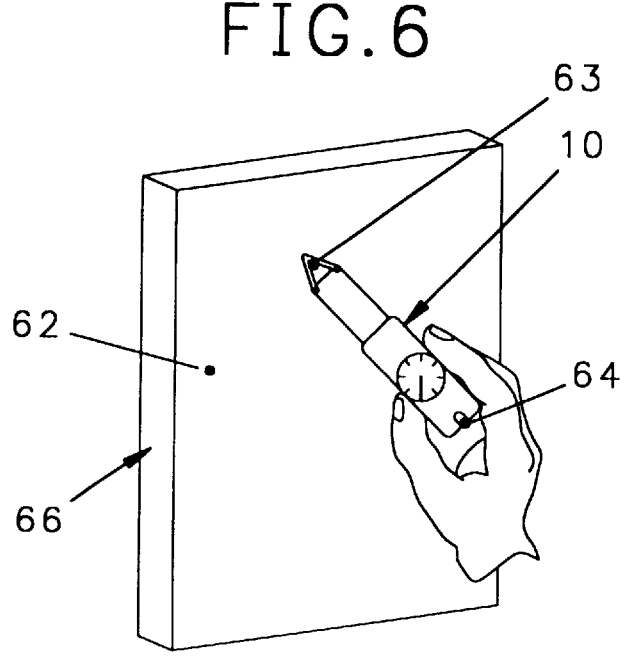
FIG. 7 is a rear view of the tape measure shown in FIG. 1 being used to record the relationship between two points on an object to be mounted.
Figure 8:
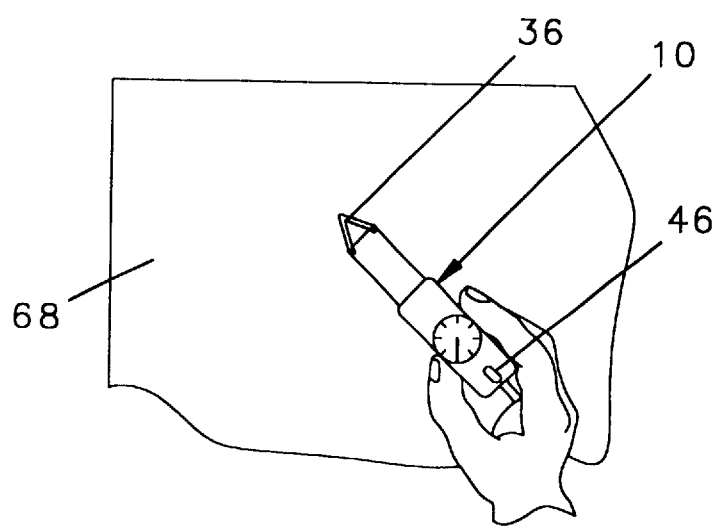
FIG. 8 is a rear view of the device shown in FIG. 1 being used to construct the relationship between two points on a wall for mounting the object shown in FIG. 7.

Referring to FIGS. 7 and 8, by way of example, the device may be used to measure the distance and the angular orientation between mounting holes 62, 63, 64 on an object 66 to facilitate the mounting of the object 66 on a wall 68. To do so the pin 36 on the distal end 34 of the tape measure 10 is inserted into one hole 63 and the thumb plate 52 is depressed allowing the tape 28 to be extended until the second pin 46 extends into the second hole 64. With the tape at the appropriate length, the thumb plate 52 is released. The spring 55 will then draw the point 50 of the pin 46 into the retracted position and locks the tape 28 against rotation. The position of the weight 40 with respect to the indicator markers 42 will record the angular orientation of the mounting holes 62, 64. The orientation and angle of suitable holes 63, 64 can then be found on a wall 68 by placing the pin 36 on the distal end 34 of the tape measure at one point on the wall at the location for the first mounting and positioning the tape measure in the inverse of the angular orientation previously recorded. The thumb plate 52 is then depressed extending the pin 46 to mark the location of the second mounting. The indentations in the wall 68 formed by the pins 36, 46 will then indicate the proper spacing and angular orientation for mounting the object 66 thereon and holes may be drilled and screws inserted as needed. The process is repeated to locate the position of a third hole to accommodate mounting 62.

Referring to FIGS. 9 and 10, a second embodiment of a tape measure 70 has a housing 72 and an extendable tape 74 with a hook 76 at the distal end thereof. In this embodiment, the retractable pin is replaced by a protrusion 78 on the forward surface 80 of the housing 72, and a notch 82 in the protrusion for receiving the point of a pencil or some other marker. To mark a predetermined length of the extended tape 74, the hook 76 will determine at one end and a pencil or some other marking device can be inserted in the notch 82 to mark the second end of the predetermined length.

The device can be used to record or find the angular orientation between any point on a vertical surface. Referring to FIG. 11, the relationships of the three pictures 90, 92, 94 can be positioned at the desired locations by using the device to find where mounting hooks 96, 98, 100 should be placed. Similarly, geometric shapes such as octagon 102 can be drawn on a vertical surface or copied as needed.

While the present invention has been described with respect to the two embodiments, it will be appreciated that many modifications and variations may be made without departing from the true spirit and scope of the invention. It is therefore the intent to make the following claims to cover all such variations and modifications which fall within the true spirit and scope of the invention.

What is claimed:

1. A device for positioning and repositioning an object on a vertical surface comprising in combination,
   a housing having a planar forward surface, a rearward surface spaced from said forward surface, a central cavity and an aperture,
   a flexible coiled tape retractable into said housing cavity,
   said coiled tape having a distal end and an axis of rotation parallel to said forward surface,
   first marking means on said distal end of said coiled tape for marking a point on a surface,
   a portion of said coiled tape extending through said aperture in said housing,
   360 degrees angle measuring means on said rearward surface for measuring the angular orientation of a line on said vertical surface with respect to vertical,
   second marking means on said housing, said second marking means moveable from a retracted position to an extended position,
   said second marking means being spring biased for movement toward said retracted position,
   locking means for locking said tape against rotation, and
   said locking means being engaged to prevent said tape rotation by movement of said moveable second marking means from said extended position to said retracted position.

2. A device in accordance with claim 1 wherein said angle measuring means is on said rearward surface.

3. A device in accordance with claim 2 wherein said angle measuring means includes a pendulum weight rotatable about an axis perpendicular to said forward surface.

4. A device in accordance with claim 3 wherein said tape has markings thereon to measure length.

5. A device for positioning and repositioning an object on a vertical surface comprising a housing having a forward surface, a rearward surface spaced from said forward surface, a central cavity and an aperture, a flexible coiled tape retractable into said housing cavity, said coiled tape having an edge, a distal end and having an axis of rotation parallel to said forward surface, measurement markings along said tape, a portion of said coiled tape extending through said aperture in said housing, said edge of said portion of said tape extending through said aperture defining a line when said forward surface is placed against said vertical surface, 360 degrees angle measuring means for measuring the angular orientation of said edge with respect to vertical, an extendable pin on said housing moveable from a retracted position wherein said pin is retracted into said housing, to an extended position, wherein said pin extends from said forward surface of said housing, a thumb plate for moving said pin from said retracted position to said extended position, a brake pad in said housing, said brake pad selectively moveable against and away from said coiled tape for locking said tape against extending or retracting from said housing, means for urging said brake pad against said coiled tape when said pin is in said retracted position.

6. A device in accordance with claim 5 and further comprising, said pin being longitudinally moveable within said housing, a spring biasing said pin into said retracted position, said brake pad having a brake surface for contacting said coiled tape for locking said coiled tape against movement, and said brake pad mounted on said pin.

* * * * *